H. OLIVIER.
VULCANIZATION OF INDIA RUBBER AND OTHER SIMILAR SUBSTANCES.
APPLICATION FILED MAY 21, 1915.
1,256,496.
Patented Feb. 12, 1918.
4 SHEETS—SHEET 1.
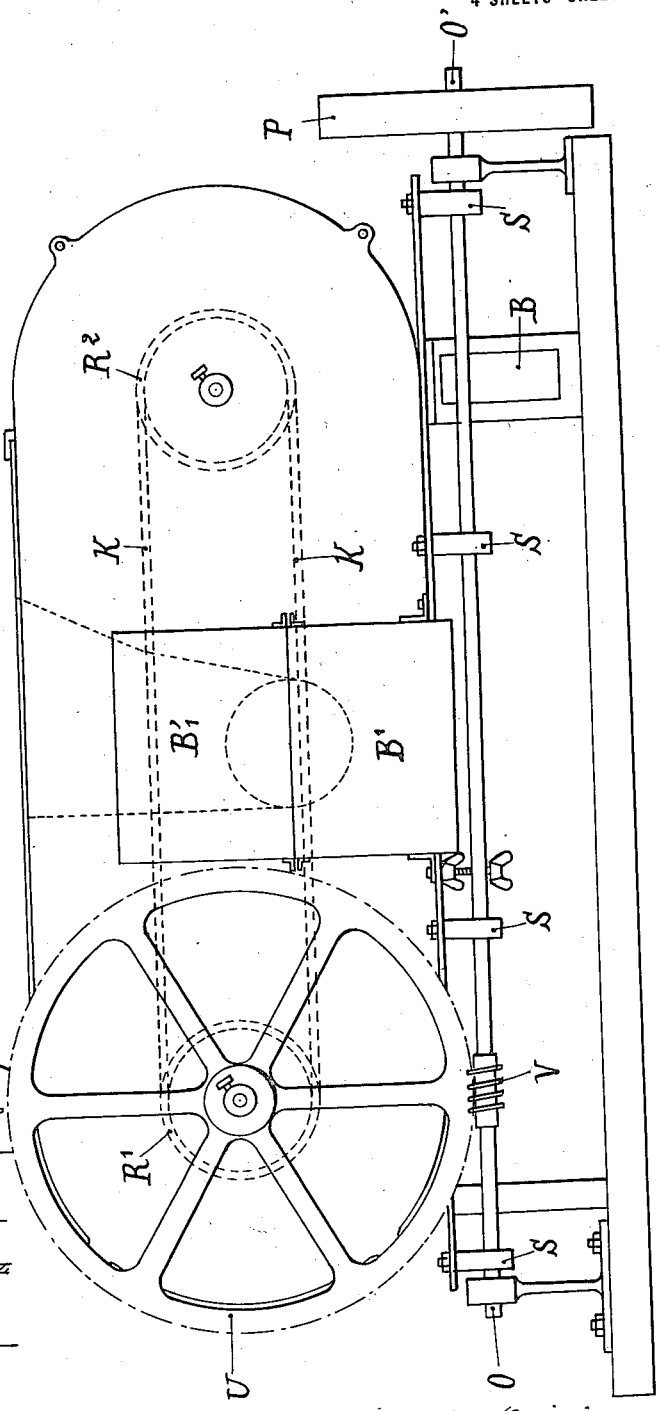

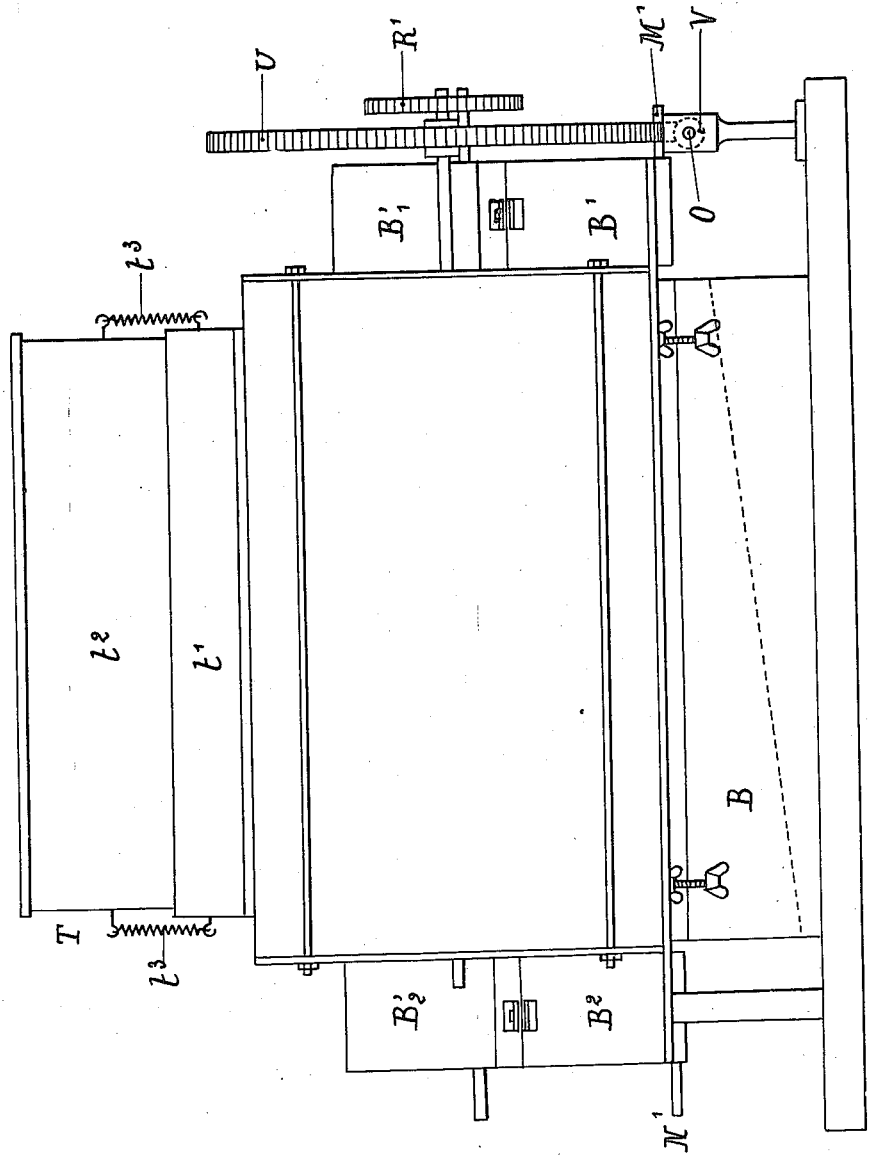

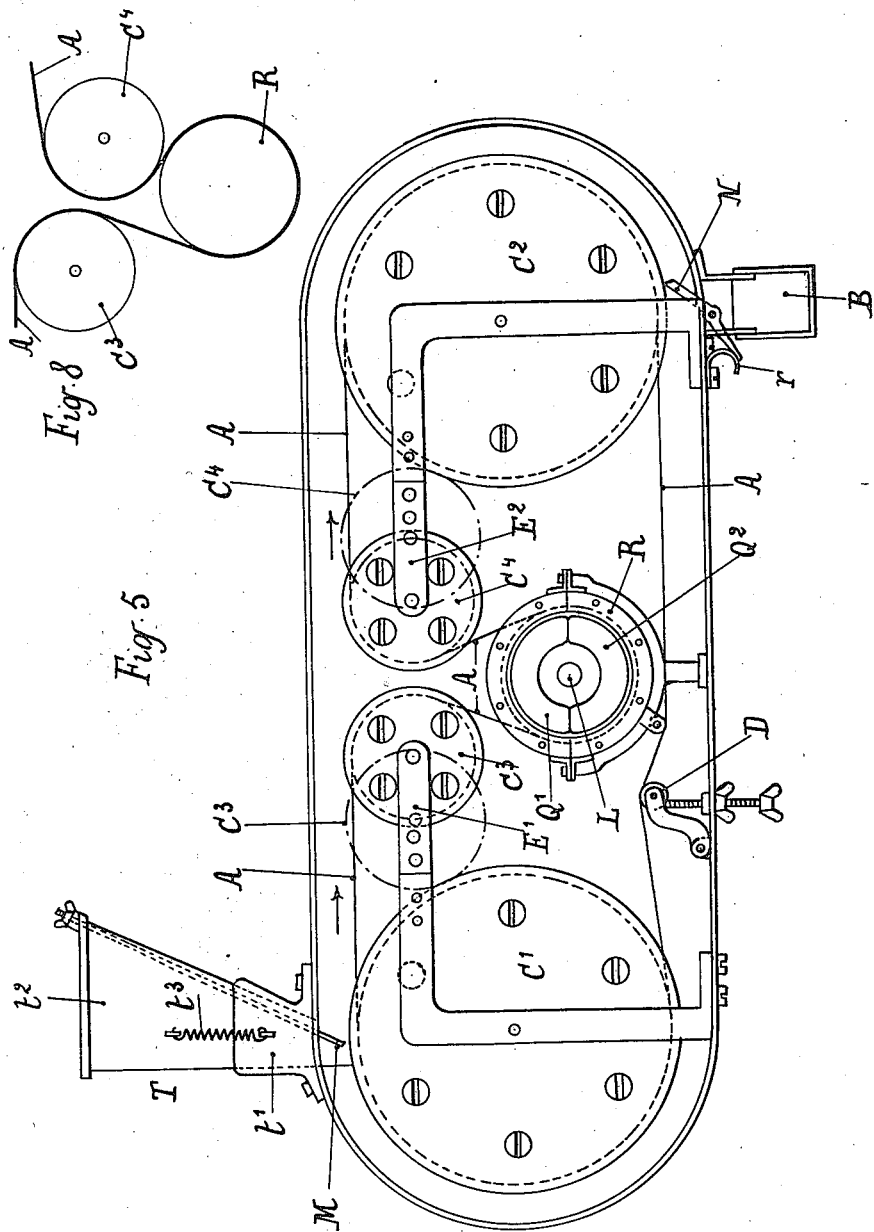

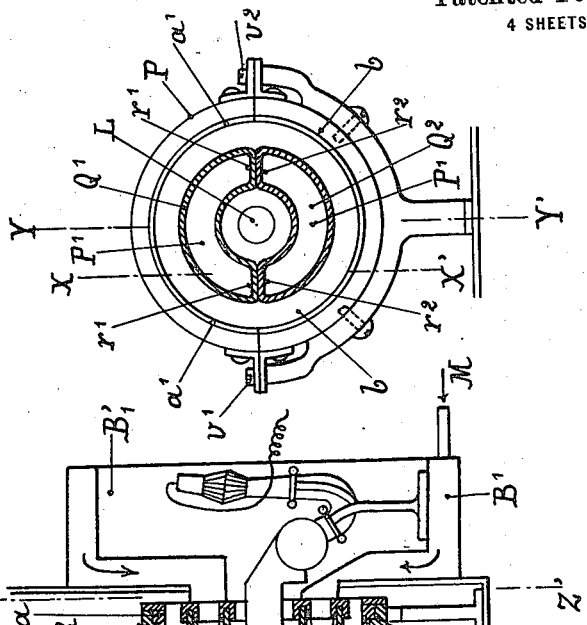
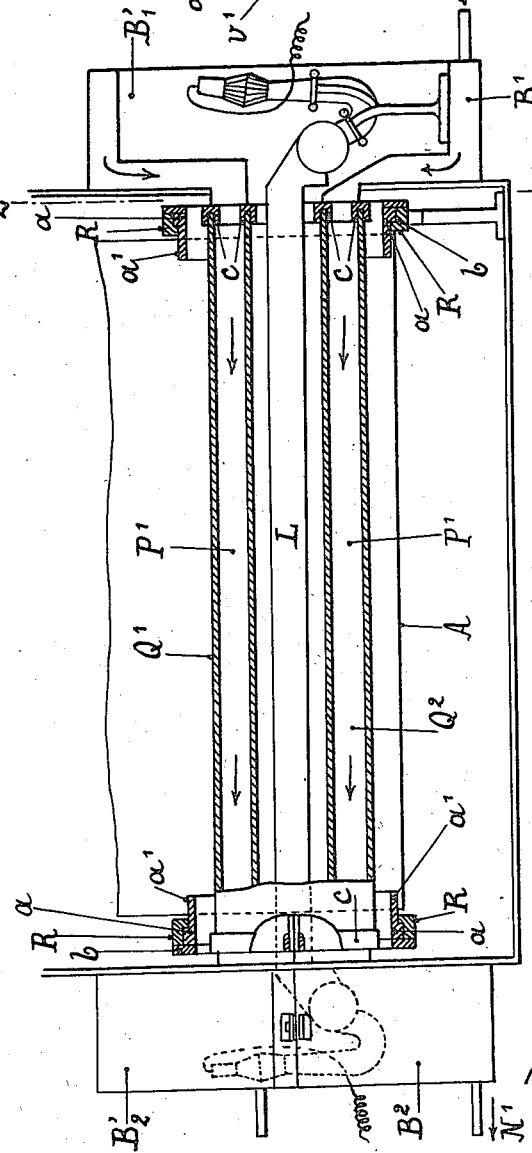

UNITED STATES PATENT OFFICE.

HENRI OLIVIER, OF PARIS, FRANCE.

VULCANIZATION OF INDIA-RUBBER AND OTHER SIMILAR SUBSTANCES.

1,256,496.   Specification of Letters Patent.   Patented Feb. 12, 1918.

Application filed May 21, 1915. Serial No. 29,501.

*To all whom it may concern:*

Be it known that I, HENRI OLIVIER, a citizen of the French Republic, residing at Paris, France, have invented new and useful Improvements in the Vulcanization of India-Rubber and other Similar Substances, of which the following is a specification.

This invention relates to a novel method and apparatus for vulcanizing rubber solutions by means of ultra-violet rays. Rubber solutions treated in this manner are particularly useful for cementing purposes, since the treatment produces thick elastic liquids which are real liquid rubbers. With former cementing processes, the surfaces of rubber to be cemented were coated with a solution containing six to 12 per cent. of rubber and usually several layers of such cement were necessary to effect the cementing.

With this method of producing the solution a much more dilute solution can be obtained than heretofore. In fact, the dilution may be 0.5 to 0.6 per cent. When this latter solution is used for cementing the two rubber surfaces to be secured together absorb the solution and, upon placing the surfaces in contact, a real autogeneous union of the two rubber surfaces can be obtained. When surfaces of rubber are so united, they are not separated by a comparatively thick layer of cement, as with former cements, but they are in immediate contact on account of the penetration due to the dilution of the solution.

This is illustrated diagrammatically in Figures 1 and 2 of the drawings. In Fig. 1, *a* and *b* are two pieces to be secured together. Using ordinary rubber cements, there is a thick intermediate layer of cement. When the cement produced by my process is used, the thickness of the cement *c* between the pieces *a* and *b* is reduced to practically an infinitesimal thickness, as shown in Fig. 2.

It will be easily understood that the latter constitutes a much stronger joint having greater resistance to heat and friction, since with ordinary cements any shearing or tearing took place in the intermediate layer *c*, while with my vulcanized solution the tearing or shearing is compelled to follow the sinuosities of the treated surfaces which penetrate into each other.

In carrying out my process, the first factor to be fixed is the duration of exposure to the ultra-violet rays. Experience has shown that after a certain time of exposure, the decomposition of the rubber increases rapidly, whereas the vulcanization effect only increases to a small extent. Therefore, contrary to expectations, the rubber becomes less and less resistant, as the duration of exposure increases. It is therefore necessary to consider a limited duration of exposure. The duration of exposure of course changes according to conditions, depending on the size lamp used, the thickness of the solution, and the distance of the solution from the lamp. An example of the duration of exposure under certain conditions is the following: When using a 220 volt, 3 ampere, quartz lamp and with a solution a fraction of a millimeter in thickness placed at a distance of 5 centimeters from the lamp, the duration limit would be forty seconds.

When solutions of rubber are being vulcanized with ultra-violet rays, the sulfur usually used can be replaced by metalloidic, metallic or organic sulfids, and in a general way, by any sulfids which can be decomposed by ultra-violet rays, such as carbon disulfid, allyl sulfid or antimony sulfid. After vulcanization, when these sulfids are used, there is no uncombined sulfur left in the solution as it is precisely the sulfur which is decomposed out of the sulfids which allies itself with the rubber. Vulcanization can also be effected by adding at the same time to the solution, ordinary free sulfur and carbon disulfid. Under these conditions, vulcanization occurs concurrently between the rubber and the sulfur decomposed out of the sulfid. This process, later described, on account of the necessity for a short exposure to the rays, effects a maximum vulcanizing effect.

In order to carry out my process, I have devised a novel apparatus which is particularly adaptable for treating rubber solutions, but which may be used for treating other liquid and solid products by ultra-violet rays. In most of the former apparatus used to submit substances to the action of ultra-violet rays, a large part of the rays produced by the mercury vapor lamps did not penetrate the substance treated. It has generally been found difficult to produce an apparatus which surrounded the lamp and utilized all of the rays produced, since it was generally necessary to assemble several separate pieces of apparatus which made the device complicated and impractical for commercial use.

In the drawings,

Figures 1 and 2, as previously stated, are diagrammatic sections of cemented joints.

Fig. 3 is a side view of the apparatus, showing the inclosing housing in position.

Fig. 4 is an end view of the apparatus shown in Fig. 3, looking from the left.

Fig. 5 is a side view of the apparatus shown in Fig. 3, with one side removed to show the parts within the housing.

Fig. 6 is a transverse sectional view of the lamp and associated parts.

Fig. 7 is a central sectional view of the lamp and parts shown in Fig. 6.

Fig. 8 is a view showing the belt and its preferred direction of travel around the lamp.

In more detail, in Fig. 5, $C'$ and $C^2$ are two cylinders revolubly mounted on brackets within the housing. To rotate the cylinders, the shaft supporting cylinder $C'$ carries at one end the toothed wheel U (Fig. 3) which is engaged by a worm V carried on a shaft O and $O'$. Secured to this shaft is a driving pulley P. In order to drive cylinder $C^2$ in unison with cylinder $C'$, I provide sprocket wheels $R'$ and $R^2$ on the cylinder shafts, and a connecting chain K. Adjacent cylinder $C'$ and $C^2$ are two smaller cylinders $C^3$ and $C^4$. These cylinders are freely rotatable on their axles and can be adjusted to and from each other by means of the slide guides $E'$ and $E^2$. These cylinders $C^3$ and $C^4$ can therefore take the dotted or full-line position shown in Fig. 5. This shifting of the small cylinders permits the lamp L to be placed in position.

An endless steel belt extends around the cylinders $C'$, $C^2$, $C^3$ and $C^4$, as shown. This belt also extends around the lamp L in a manner to be hereafter described. The slack in the belt A is taken up by an adjustable idler D which can also adjust the tension on the belt A. It will be understood that the belt A is set into motion by cylinders $C'$ and $C^2$ on their rotation; and for guiding it, equidistant from the lamp L, there are provided parts R comprising fixed bronze collars which are grooved to receive annular rotatable members $a$, which are preferably made of steel. These latter members extend beyond the bearings, as shown at $a'$, and it is this part which forms a circular track to support the belt A in its passage around the lamp L. To prevent the rotatable parts from shifting laterally in the bearing collars, I provide bronze end plates $b$. Parts $a$, $a'$ and $b$ are all circular in section and split into two semi-circular halves so that they can be separated to put the lamp in place. The halves of the parts R are joined by screws $v'$ and $v^2$ which also secure R to a standard or base (see Figs. 6 and 7).

At the top of the apparatus is a feeding funnel T. This is composed of two parts, a lower part $t'$ and upper part $t^2$ which extends inside the lower part $t'$. These two sections of the feeding funnel are joined by a spring $t^3$. The funnel T distributes the solution of rubber on the belt by means of a doctor blade M. By adjusting this doctor blade up and down, the thickness of the liquid on the belt can be regulated.

At the lower part of the apparatus, I provide a small scraper N pressed by a blade spring $r$ into engagement with the belt A. This scraper N removes the treated semi-liquid solution from the tape or belt and directs it into a storage box B from which it may be removed from time to time.

In order that the temperature adjacent the lamp may be kept from rising and thus prevent evaporation of the liquids used in the solutions, the lamp L is surrounded by two quartz cells $Q'$, $Q^2$, which are substantially semicircular in form in section and are provided with flat faces $r'$, $r^2$. These cells $Q'$ and $Q^2$ are placed with their flat sides together between end boxes $B^2$ and $B^{2'}$, $c$, $c$, $c$, $c$, representing the joints between the cells and the aforesaid boxes.

A current of water enters by pipe M into the boxes $B^1$ and $B^{1'}$, passes through part $P'$ of the quartz cells, thence through boxes $B^2$, $B^{2'}$, and finally out of the apparatus through pipe $N'$. The solution to be treated by ultra-violet rays is thus protected in an efficacious way against the calorific radiation produced by the lamp.

In Fig. 8 is shown a slightly modified arrangement of cylinders $C^3$ and $C^4$. These cylinders are shown in Fig. 5 on the same level, but I prefer to raise one, i. e., $C^3$, slightly so that the steel ribbon does not have such an abrupt angle of approach to the cylinder. This diminishing of the angle minimizes the liability of kinking the belt A.

In order to start the lamp, I arrange the apparatus so that it can be rocked as a whole. This is done by mounting the housing on brackets S which brackets are journaled on the driving shaft O—$O'$. After the apparatus is rocked and the lamp is started, the solution to be vulcanized is put in the funnel T and spread on the belt A. Movement of the ribbon carries the solution around the lamp L at a uniform distance therefrom and finally the solution is scraped into the box B. It will be seen that with my improved structure, the duration of exposure to the rays may be easily changed by moving the belt faster, the thickness of solution can be regulated by regulating blade M, and the maximum of rays are intercepted by the solution being treated.

What I claim is:

1. An apparatus for exposing liquid solutions to the action of ultra-violet rays, comprising, in combination, a lamp, an endless belt, means for applying a layer of solution to said belt, and means for advancing the belt in proximity to the lamp for exposing the solution thereon to the lamp.

2. An apparatus for exposing substances to the action of ultra-violet rays, comprising, in combination, a plurality of rotating cylinders, an endless belt supported and driven thereby, a lamp between said cylinders, and means for directing said belt around said lamp, comprising a plurality of idler cylinders and supporting elements adjacent the lamp.

3. An apparatus for exposing substances to the action of ultra-violet rays, comprising, in combination, a pair of rotating cylinders, an endless belt supported thereby for carrying the substance to be exposed to the rays, a lamp for producing the ultra-violet rays, a pair of quartz cells around the lamp, said cells being semi-cylindrical in form and having double walls, means for directing the aforesaid belt around said quartz cells, and means for introducing a cooling medium into the quartz cells to prevent calorific radiations reaching the substance carried by the belt.

4. An apparatus for the exposure of substances in thin layers to ultra-violet rays, comprising, in combination, a belt to carry the substance to be treated, means for applying a thin layer of the substance to said belt, a lamp emanating ultra-violet rays, means for advancing the belt, and means for guiding said belt around the lamp.

5. An apparatus for the exposure of substances in thin layers to ultra-violet rays, comprising, in combination, a belt to carry the substances to be treated, means for advancing the belt, means for applying the substance to the belt, said means having a controlling device to control the thickness of the substance on the belt, and means for directing said belt adjacent a source of ultra-violet rays.

6. An apparatus for the exposure of substance in thin layers to ultra-violet rays, comprising, in combination, a belt to carry the substances to be treated, a source of ultra-violet rays, means for advancing the belt adjacent the source of rays, a storage funnel, means for directing the substances from the storage means to the said belt, a storage reservoir, and means for removing the treated substance from the belt and directing said material into the storage reservoir.

7. An apparatus for the exposure of substances to ultra-violet rays, comprising, in combination, a belt to carry the substances to be treated, supports for the belt, a driving shaft and connections between said shaft and the belt supports for turning the same and advancing the belt, a lamp adjacent the ribbon, supports for said lamp, and means for tilting the said apparatus about the aforesaid driving shaft to start the lamp.

8. An apparatus for the exposure of substances to ultra-violet rays, comprising a lamp for emitting the ultra-violet rays, a pair of semi-cylindrical double walled quartz cells surrounding the lamp, a belt to support the substance to be treated, a plurality of circular tracks adjacent the periphery of said cells, said tracks being adapted to support the belt slightly distant from the periphery of the quartz cells, and means for separating the cells and tracks into semi-circular halves to obtain access to the lamp.

In testimony whereof I affix my signature in presence of two witnesses.

HENRI OLIVIER.

Witnesses:
 JEAN MAUAR,
 DUN C. POOLE, Jr.